United States Patent [19]

Baer

[11] 3,998,779
[45] Dec. 21, 1976

[54] COATING METHOD AND COMPOSITION FOR THE SACRIFICIAL PROTECTION OF METAL SUBSTRATES

[75] Inventor: Robert B. Baer, San Antonio, Tex.

[73] Assignee: Chromalloy American Corporation, New York, N.Y.

[22] Filed: Feb. 13, 1975

[21] Appl. No.: 549,775

Related U.S. Application Data

[62] Division of Ser. No. 362,062, May 21, 1973, Pat. No. 3,887,449.

[52] U.S. Cl. .................. 260/37 EP; 260/37 M; 106/84; 106/290
[51] Int. Cl.$^2$ .................................. C08K 3/08
[58] Field of Search ........... 106/290, 84; 75/168 B, 75/168 H; 427/388; 260/37 M, 37 EP

[56] References Cited

UNITED STATES PATENTS

| 2,540,108 | 2/1951 | Fisher | 106/290 |
|---|---|---|---|
| 3,276,893 | 10/1966 | Qudas et al. | 106/290 |
| 3,562,124 | 2/1971 | Leon et al. | 106/84 X |
| 3,620,876 | 11/1971 | Guglielmo et al. | 260/37 M X |
| 3,716,609 | 2/1973 | Trocciola et al. | 260/37 M X |
| 3,748,292 | 7/1973 | Stander | 260/37 M X |

*Primary Examiner*—Donald E. Czaja
*Assistant Examiner*—S. M. Person
*Attorney, Agent, or Firm*—Hopgood, Calimafde, Kalil, Blaustein and Lieberman

[57] ABSTRACT

A coating method and coating composition are provided for the sacrificial protection of metal substrates, e.g. magnesium and magnesium alloys, wherein the coating bonded to the metal substrate comprises a non-metallic adhesive material, such as an epoxy resin, having dispersed therethrough a powdered alloy composition which is electropositive to the metal substrate, said coating composition being electrically conductive relative to said metal substrate.

3 Claims, No Drawings

COATING METHOD AND COMPOSITION FOR THE SACRIFICIAL PROTECTION OF METAL SUBSTRATES

This is a division of copending application Ser. No. 362,062 filed May 21, 1973, and now U.S. Pat. No. 3,887,449.

This invention relates to the sacrificial protection of metal substrates and, in particular, to a method and a composite coating material for the protection of corrodable metal substrates, such as magnesium, magnesium alloys and other metal substrates.

STATE OF THE ART

The use of certain types of metals, such as magnesium and magnesium alloys, has found limited use in the aircraft industry due to the fact that such metals are highly reactive in saline environments, e.g. in saline atmospheres adjacent the coastline. Magnesium, in particular, is especially subject to atmospheric corrosion due to the salt content.

Two types of corrosion have been noted with respect to magnesium and its alloys: a type known as exfoliation and another type referred to as pitting corrosion. Exfoliation is the most destructive of the two types. Magnesium casting alloys, such as AZ91, are particularly subject to exfoliation corrosion, while such extruded alloys as AZ31 are subject to pitting corrosion when the surfaces of such alloys are locally exposed, even when protected by paint or other protective system.

Several attempts have been made to provide systems for retarding the corrosion of magnesium parts by exfoliation and pitting. However, systems proposed to date have not been too satisfactory. For example, such attempts have included chromate and/or phosphate conversion coatings or modification of the surface by dipping the magnesium part in a fluoride bath followed by the application of a paint.

One method is disclosed in U.S. Pat. No. 2,276,286 (dated May 17, 1942). In this patent, the method is directed to the production of corrosion resistant coatings on magnesium and magnesium alloys in which the metal is first anodized in a bath containing phosphate and chromate radicals, the pH of the bath being on the acid side. The coated metal is subjected to a treatment with an aqueous solution containing manganous sulfate and a water soluble compound selected from chromates and dichromates and thereafter immersed in a drying oil selected from the group consisting of tung oil, linseed oil and fish oil.

So long as the foregoing coatings remained continuous without cracks or abrasions, they protected the substrate metal. However, these coatings are of little value if the base metal is exposed in service due to cracking, chipping or spalling of the protective coating.

Protective metal coatings are known for other substrate metals, such as steel, wherein the protective metal coating is one which is diffused thermally into the steel surface at an elevated temperature, the coating metal being electropositive to the substrate metal and being sacrificial relative to the substrate, such that even if the substrate is exposed locally, the sacrificial coating corrodes in preference to the steel substrate and thus protects it.

A coating metal found particularly useful for protecting steel is aluminum. This metal is applied by pack cementation by embedding the steel article to be coated in a powder pack containing aluminum powder, aluminum oxide and a small but effective amount of a halide, e.g. $AlCl_3$, the article and the pack being enclosed in a retort and the retort heated to an elevated temperature ranging as high as 2000° F. The halide acts as an energizer to effect transport of the aluminum to the steel surface for diffusion therein, iron aluminide being formed by reaction of the diffused aluminum with iron. The coating thus formed is electropositive to the steel substrate and protects it sacrificially.

The foregoing method is not applicable to the coating of magnesium and alloys thereof for the one reason that the melting point of magnesium is low (about 1007° F) and for another that magnesium is a very electropositive metal and the metals in the electromotive series sacrificial to it, such as strontium, barium, calcium, etc., are very reactive in a moist environment and are not useful as coating metals when applied to a metal substrate in a conventional manner.

It would be desirable to provide a method for the sacrificial protection of magnesium and its alloys, and other substrate metals as well, which would not require the thermal diffusion of an electropositive metal into the substrate and, thus, which would not adversely affect substrate metals having relatively low melting points.

OBJECTS OF THE INVENTION

It is thus the object of the invention to provide a method for the sacrificial protection of a metal substrate, wherein a bondable composite coating material is applied to the metal substrate having sacrificial properties relative to said metal substrate.

Another object is to provide a method for applying a protective coating onto a metal substrate comprising a composite coating material formed of a bondable non-metallic adhesive material having dispersed therethrough a powdered alloy composition which is electropositive relative to the metal substrate, the composite coating material being substantially electrically conductive relative to the metal substrate.

A further object of the invention is to provide a composite coating material for use in protecting magnesium and alloys thereof against corrosion.

Another object of the invention is to provide a composite sacrificial coating material for use in protecting metal substrates comprising a bondable non-metallic adhesive material having uniformly dispersed therethrough a powdered alloy composition comprising a metal from the group consisting of strontium, barium and calcium with the balance substantially magnesium.

It is also an object of the invention to provide a composite article of manufacture comprising a metal substrate and a protective coating bonded thereto constituting a non-metallic adhesive material having a powdered alloy dispersed substantially uniformly therethrough, the powdered alloy being electropositive relative to said metal substrate, said bonded protective coating being substantially electrically conductive relative to the metal substrate.

These and other objects will more clearly appear when taken in conjunction with the following disclosure and the appended claims.

THE INVENTION

The invention resides in the discovery that a sacrificial coating can be applied to metal substrates, such as magnesium and magnesium alloys, by utilizing a bondable composite coating composition formed of a non-metallic material with a powdered alloy composition dispersed therethrough which is electropositive to the metal substrate, the bondable composite coating being also substantially elecrically conductive relative to the metal substrate to provide galvanic protection thereof. The non-metallic adhesive material in which the powdered alloy is dispersed may comprise a curable plastic adhesive, an alkali metal silicate, or other non-metallic composition capable of bonding to the metal substrate and of providing a strong adherent coating.

One embodiment of the invention resides in preparing the metal substrate to receive the composite coating material, applying and bonding the composite coating material to the substrate and, where necessary, curing the composite coating on the surface of said substrate.

As stated hereinbefore, in order to protect magnesium and alloys thereof, the sacrificial material in the coating should be electropositive to the metal substrate, that is, metals which lie above magnesium in the electromotive series. Since these metals are very reactive (e.g. Li, Na, K, Sr, Ba, Ca), alloys of such metals with magnesium or other metals may be used. Examples of such alloys are: 50% Ca-50% Mg, 25% Ca-5%Al-70% Mg, and the like. As will be understood, various alloy compositions can be used so long as the alloy is electropositive to the substrate metal. The preparation of such alloys requires the use of inert or other protective condtions or atmospheres, such as helium, argon, nitrogen, vacuum and the like. The alloys should be finely divided and preferably be less than 325 mesh (U.S. Standard), for example, less than 20 microns. To avoid ignition of the alloy, it may be ball milled in hexane or other suitable vehicle or atmosphere, such as any inert dry gas or saturated hydrocarbon liquid, or vacuum; or it may even be cryogenically ground under inert conditions.

A preferred alloy composition comprises broadly 5% to 60% of a calcium group metal selected from the group consisting of strontium, barium and calcium, 0% to 20% aluminum and the balance substantially magnesium ranging from about 40% to 95% magnesium by weight. Preferably, the calcium group metal may range from about 15% to 40% by weight, 0 to 20% aluminum and the balance substantially magnesium.

As stated hereinabove, the non-metallic material in which the finely divided alloy is dispersed may be any bondable material, such as a curable plastic adhesive, alkali metal silicates (e.g. sodium silicate, lithium silicate, potassium silicate) or the like. The amount of alloy dispersed in the non-metallic material should be sufficient to provide sacrificial properties and may range from about 10% to 50% by weight of the coating in the cured state.

Particularly useful plastic adhesives are epoxy resins. Such resins are advantageous in that by using an epoxy-catalyst combination, curing can be effected in situ under ordinary ambient conditions or the curing accelerated at above ambient temperature, e.g. 125° F. Moreover, epoxy resins strongly adhere to metal substrates and produce strong hard coatings. Epoxy resins fall into two broad categories, to wit: liquid resins and solid (hard) resins. The hard resins which tend to be chemically inert (e.g. catalyzed or otherwise cured epoxy resins) are particularly preferred in situations involving resistance to corrosion, resistance to organic solvents, chemicals, and the like. Epoxy resins are further desirable because they are easy to formulate and because they exhibit good dimensional stability.

Epoxies belong to resinous products containing ether groups. The common basic epoxy polymer is formed by reacting epichlorohydrin with bisphenol A on the presence of alkali. The outstanding properties of adhesion, flexibility, toughness, and chemical resistance of epoxy resins are obtained by chemical reaction with catalytic curing agents, which convert the resin to chemically and mechanically strong polymers. Amine catalysts are common curing agents. These amines include ternary amines and the acid salts of the ternary amines. The aliphatic polyamines are examples of room temerature hardeners. These include diethylene triamine, triethylene tetramine, tetraethylene pentamine, etc. Diethylene triamine is a low viscosity volatile liquid which reacts readily with epoxide compounds to form insoluble thermosetting resins.

Many hardeners cure at elevated temperatures to develop ultimate physical properties. Examples are aromatic amines and organic anhydrides. Aromatic amines include methylene dianiline and meta-phenylene diamine. These hardeners are usually melted and blended with resin that has been warmed to 200–220° F. Diamino diphenol sulfone gives good performance at temperatures above 350° F. Examples of organic anhydrides are phthalic anhydride, methyl nadic anhydride, dodecenyl succinic anhydride, and the like.

Hard epoxy resins must be dissolved in solvents before being used as coatings. Active solvents are ketones and esters, while alcohols may be used as latent solvents and aromatic hydrocarbons as diluents. For spray applications, such solvents as MEK, MIBK, ethyl alcohol, toluol and xylol may be used. Thinners for the epoxy resins are generally about 50% active solvents and 50% diluents.

Polyurethane coatings are also useful in producing the composite coating material of the invention. The reaction of an isocyanate (e.g. phenol isocyanate) with an alcohol (e.g. ethyl alcohol) produces urethane. The diisocyanates are preferred to the isocyanates for the production of polymeric materials. The resins produced by the reaction of polyisocyanates with polyfunctional hydroxyl carriers range from linear rubberlike polymers to highly cross-linked network structures. Coatings of such compositions have a high degree of chemical resistance, abrasion resistance, adhesion, toughness and flexibility.

Details concerning the foregoing organic coatings or adhesives are available in a publication entitled "Synthetic Resins in Coatings" (published in 1965 by Noyes Development Corporation, Park Ridge, New Jersey).

Alkali metal silicates are useful in that they can be applied to metal substrates as solutions or slurries with other ingredients by dip coating or spraying and cured after drying by heating at temperatures not exceeding, for example, 450° F, which make such coatings useful for magnesium and alloys thereof. Thus, the silicate may be prepared as a solution into which the powdered alloy composition is dispersed to form a composite coating material prior to applying the composite coating to the metal substrate.

It is preferred, with respect to substrates of magnesium and magnesium alloys, that the curing temperatures of the coating be as low as possible.

As has already been stated, in order to assure galvanic protection of the metal substrate, the composite coating material should be electrically conductive relative to the metal substrate, such that any local exposure of the metal substrate results in the metal substrate being cathodic relative to the powdered alloy material in the coating, the alloy in the coating being preferentially corrodable, thus protecting the metal substrate.

The coating material may be intrinsically electrically conductive or may be rendered electrically conductive according to the amount of powdered alloy material dispersed therein. However, where the amount of powdered alloy employed is not sufficient to provide the desired electrical conductivity, this can be achieved by adding finely divided carbon (e.g. carbon black) to the composite coating material or by adding other electrically conductive material, such as carbonyl nickel powder (2 to 7 microns), carbonyl iron powder (2 to 7 microns), or other finely divided electrically conductive material. The electrically conductive material may be a colloidal dispersion, such as colloidal carbon. The amount added may range anywhere from above 0.5% to about 20% by weight of the total composition of the composite coating material, depending upon the particle size of the material. The finer the particle size, the less is the amount of electrically conductive material used. The percent by weight of the electrically conductive material is based on the composition as applied on the metal substrate and cured.

Where the metal substrate is magnesium or alloys thereof, the preferred method employed may broadly comprise anodizing the metal substrate to form an adherent oxide film thereon to which the composite coating material is bonded. The composite coating material which is electrically conductive and which contains a bondable non-metallic adhesive material with the alloy powder dispersed therein is applied to the metal substrate and allowed to harden thereon, either by curing at an elevated temperature not exceeding about 450° F or in situ where the coating material is curable under ambient conditions.

It may be desirable, with respect to magnesium and alloys thereof, to apply an intermediate coating to further improve the protective properties of the coating. One embodiment comprises anodizing the magnesium-base substrate, applying an intermediate coating (a first protective coating) of a double salt selected from the group consisting of barium potassium chromate and calcium potassium chromate dispersed through a non-metallic curable adhesive, e.g. epoxy resin, curing the intermediate coating thereon and then applying as a second protective coating the composite coating material over the double salt coating. The double salt is sufficiently electrically conductive when exposed to a moist environment due to cracking of the outer coating to provide galvanic coupling of the outer coating to the metal substrate. Tests indicate the double salt coating to be sacrificial.

As will be appreciated, the invention may take various forms. As illustrative of the various embodiments of the invention, the following examples are given:

EXAMPLE 1

Magnesium alloy AZ91 was treated in accordance with the invention by employing four steps as follows: (a) precleaning of the surface, preferably by glass bead honing; (b) anodizing the surface of the alloy; (c) applying a protective primer coat (e.g. a sacrificial double salt coating); and (d) applying the composite coating composition (also a sacrificial coating). If desirable, an overcoat of clear epoxy may be applied to the composite coating.

The alloy may be anodized by formulating the following solutions by weight:

| Solution A | — 33% chromic acid<br>3% $H_3PO_4$ (based on 85% conc.)<br>3% Zn derived from $ZnCO_3$ or Zn acetate |
|---|---|
| Solution B | — 25% by volume of potassium silicate (50% solu.) |
| Solution C | — 85% solu. of $H_3PO_4$ (conc.) |
| Solution D | — 48%–54% solution of HF |

The anodizing solution is prepared by blending the foregoing solutions as follows:
200 ml Solution A at 180° F
200 ml Solution B at 150° F
50 ml Solution C at 150° F
10 drops Solution D The foregoing solution tends to gel on standing (thixotropic) but becomes liquid on stirring. The magnesium alloy part is anodized in the solution at a bath temperature of about 150° F using the part as the anode and an insoluble cathode of lead. The current density of about 1 to 2 amps per sq. inch is applied for about 5 minutes. The part is then rinsed in flowing water.

Finely divided double salt of barium potassium chromate was dispersed in a vehicle comprising epoxy resin, a catalyst and a thinner. The formulation comprised 3.63 pounds of epoxy resin, 3.63 pounds of the catalyst (aliphatic amine) and a thinner comprising solvents xylol and diisobutyl ketone and normal butyl alcohol as a diluent, the amount of dispersed double salt being 2.08 pounds.

The foregoing formulation is sprayed onto the surface of the anodized part and after one or two coats have been deposited, the applied coating is force-cured generally in the range of 100°–350° F. A force cure at 125° F for one hour in an oven has been found adequate. Linear polyurethane adhesives have also been found adequate for producing the primer coat.

Following curing of the primer coat, a composite coating composition is applied containing a powdered sacrificial alloy. A preferred alloy found particularly useful contains about 25% Ca, 5% Al and 70% Mg. The composite coating composition was formulated as follows: 3.63 lbs. of epoxy resin, 3.63 lbs. of catalyst (aliphatic amine), 2.08 lbs. of the foregoing alloy (minus 325 mesh), 0.42 lb. of very fine carbon and sufficient thinner as described above to render the formulation sprayable. The amount of alloy on the dry basis is about 21% by weight. The formulation is sprayed over the primer coat, dried and the curing accelerated by heating at 150° F to 200° F for one hour. Holding at room temperature thereafter further improves bonding characteristics. In a preferred embodiment, an overlayer of clear epoxy was applied comprising 50% epoxy and 50% curing agent and sufficient thinner to provide proper spraying consistency. A hard coating is obtained which protects the metal-loaded epoxy matrix from total exposure.

The coated magnesium part provided a life of over 500 hours and up to about 1000 hours when subjected to a salt spray test according to ASTM B 117–64, with a portion of the base metal exposed during the test.

EXAMPLE 2

A part made of magnesium alloy AZ31 is anodized electrolytically as in Example 1. A sodium silicate solution is prepared containing 25% by volume of sodium silicate (based on a 41.5 Baume solution) corresponding to 7.3 wt.% of $SiO_2$ equivalent. To the solution is added 20% by weight of an alloy composition of −325 mesh (U.S. Standard) comprising by weight 15% Ca, 5% Al and 80% Mg. The mixture is sprayed onto the anodized surface and then cured at about 300° F for about ½ hour in an infra-red furnace. The amount of alloy added is sufficient to provide an electrically conductive composite coating.

In another embodiment, the anodized magnesium alloy is first coated with the double salt calcium potassium chromate using a formulation similar to that employed for the doublt salt barium potassium chromate. Following aging of the double salt coat at 150° F, an additional sacrificial coating is applied by spraying comprising the aforementioned sodium silicate solution containing 20% by weight of an alloy −325 mesh in size, the alloy containing 25% Ca, 5% Al and the balance essentially magnesium. The sprayed coating is cured at about 150° F for about 2 hours.

EXAMPLE 3

I. A part made of aluminum Alloy No. 3005 is treated by anodizing in a 15% sulfuric acid bath with aluminum as the anode at a current density of about 15 amps/sq.ft. at 15 volts for about 15 minutes. The anodized surface following washing and drying is coated with a primer coat of barium potassium chromate dispersed in a polyurethane resin on a 50:50 weight basis. The polyurethane resin is provided by blending reactive isocyanate prepolymers with hydroxyl-bearing resins. To the 50:50 blend of the double salt and the resin adhesive is added a thinner comprising xylol sufficient to enable the spraying of the mix. After spraying the primer coat on the anodized surface, it is cured by baking at about 150° F for 3 hours. Thereafter, a composite coating composition is applied comprising 4 pounds of said polyurethane resin mixed with 2 pounds of a finely divided alloy of 50% Ba and 50% Mg, sufficient thinner of toluol being added to enable spraying of the mix onto the primer surface. Following spraying, the coating is dried and cured at 200° F for ½ hour. The dried coating contains about 33% by weight of the sacrificial alloy.

II. Galvanic corrosion of a component comprising an aluminum block having a fastener of titanium coupled thereto is inhibited by coating the titanium fastener with a sacrificial composition similarly as in the foregoing examples. The titanium fastener is first anodized and then coated with a primer coat of barium potassium chromate as in Example 1. The primer coat alone resulted in a salt spray protection of the metal in excess of about 1000 hours. Instead of the aluminum corroding, the sacrificial coating on the titanium fastener corroded preferentially, thereby protecting the aluminum.

III. In this embodiment, a low carbon steel is protected. The surface is grit blasted to provide anchorage for the overcoat. The overcoat comprises a curable polyurethane resin containing about 15% by weight of a sacrificial alloy comprising 25% Sr, 10% Al and 65% Mg, the overcoat also containing about 5% by weight of carbonyl nickel powder (2 to 7 microns in size) to assure an electrically conductive coating composition relative to the steel substrate. A thinner is employed as is well known in the art so that the composite coating composition can be easily applied to the steel substrate by spraying. Following application of the coating, the coating is dried and cured at about 175° F for several hours.

IV. The steel substrate in (III) is also protected by using a powdered sacrificial alloy comprising $Mg_2Si$ which is mixed with the epoxy resin in an amount comprising 15% by weight together with about 1% by weight of colloidal carbon to assure an electrically conductive composite coating material.

V. With regard to (III) and (IV) an intermediate primer coat of barium potassium chromate is applied as in Example 1.

As will be apparent to those skilled in the art, other plastic coating materials may be used as an adhesive vehicle for the powdered metal alloy. Acrylic resins are particularly useful, such as ethyl and methyl methacrylate resins. Alkyd and the like resins may also be used as the non-metallic material.

As illustrative of the various powdered metal compositions that can be employed as the sacrificial material, the following examples are given:

| % Sr | % Ba | % Ca | % Al | % Mg |
|------|------|------|------|------|
| 10   | —    | —    | 10   | 80   |
| —    | 15   | —    | 5    | 80   |
| —    | 10   | 10   | 5    | 75   |
| —    | —    | 15   | —    | 85   |
| —    | —    | 10   | —    | 90   |
| —    | 20   | —    | —    | 80   |
| —    | 25   | —    | 5    | 70   |
| —    | —    | 25   | 5    | 70   |
| —    | —    | 50   | —    | 50   |

Depending upon the metal substrate to be protected, other sacrificial metal compositions include magnesium silicide (e.g. $Mg_2Si$), iron aluminide, nickel aluminide, and the like.

Generally speaking, the powdered alloy composition should be one sufficiently electropositive relative to the substrate metal, that is, the voltage difference according to the electromotive force series is preferably at least about 0.1 volt to provide sufficient galvanic protection of the metal substrate.

In the case where the metal substrate is steel, the powdered metal or alloy as mentioned above may be iron aluminide, magnesium silicide, nickel aluminide, and other metals or alloys which are above steel in the electromotive series.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A composite sacrificial coating material for protecting a metal substrate against corrosion which comprises a bondable curable non-metallic adhesive material having uniformly dispersed therethrough from about 10% to 50% by weight of a powdered alloy composition, said alloy composition ranging by weight from about 5% to 60% of a metal selected from the group consisting of strontium, barium and calcium, 0% to about 20% aluminum and the balance substantially magnesium ranging from about 40% to 95%, said coating material being electrically conductive relative to the metal substrate.

2. The composite sacrificial coating material of claim 1, wherein the non-metallic, adhesive material is selected from the group consisting of alkali metal silicates and curable plastic adhesive.

3. The composite sacrificial coating material of claim 2, wherein the non-metallic curable plastic adhesive is a curable epoxy resin.

* * * * *